United States Patent [19]
Carlson

[11] Patent Number: 5,659,413
[45] Date of Patent: Aug. 19, 1997

[54] LASER SATELLITE COMMUNICATION SYSTEM

[75] Inventor: Robert T. Carlson, Pepperell, Mass.

[73] Assignee: The Mitre Corporation, Bedford, Mass.

[21] Appl. No.: 395,452

[22] Filed: Feb. 28, 1995

[51] Int. Cl.⁶ .................................................. H04B 10/00
[52] U.S. Cl. ............................................ 359/172; 359/181
[58] Field of Search ................................. 359/172, 180, 359/181, 187, 188, 152, 153, 159; 372/43, 50

[56] References Cited

U.S. PATENT DOCUMENTS

| | | | |
|---|---|---|---|
| 5,142,400 | 8/1992 | Solinsky | 359/155 |
| 5,218,467 | 6/1993 | Ross et al. | 359/172 |
| 5,353,294 | 10/1994 | Shigeno | 372/43 |
| 5,465,170 | 11/1995 | Arimoto | 359/159 |
| 5,475,520 | 12/1995 | Wissinger | 359/172 |

OTHER PUBLICATIONS

R.T. Carlson, "Technologies and techniques for lasercom terminal size, weight, and cost reduction". 1990, Free-Space Laser Communication Technologies II, SPIE vol. 1218, pp. 62–69.

Tan, et al., "Liquid crystals for lasercom applications". 1991, SPIE.

R.T. Carlson,, "An Advanced Lasercom Terminal for Intersatellite Crosslinks". 1994, American Institute of Aeronautics, Inc.

*Primary Examiner*—Wellington Chin
*Assistant Examiner*—Rafael Bacares
*Attorney, Agent, or Firm*—Fish & Richardson, P.C.

[57] ABSTRACT

A laser communication system adapted for use in a satellite communication system. The satellite carries a laser communication system. The laser communication system includes a plurality of active and passive optical elements packaged in a monolithic, or single block, structure for interfacing between a focusing beam director of the satellite and laser transmitters/receivers of the laser communication system. Laser energy is directed between the beam director and the transmitters/receivers by the active and active optical elements, such laser energy passing through the monolithic structure solely as collimated light. In this way, relay elements, such as diffractive optics and focusing lenses, and there concomitant alignment requirements, are eliminated from the monolithic structure.

62 Claims, 5 Drawing Sheets

LASER SATELLITE COMMUNICATION SYSTEM

BACKGROUND OF THE INVENTION

This invention relates generally to satellite communication systems and more particularly to laser satellite communication systems wherein data is transmitted to, and/or from a satellite using lasers.

As is known in the art information is sometimes transmitted between various locations on the earth by routes which include satellites. More particularly, in the routing process, information may be transmitted from a ground station along the route to a satellite. The receiving satellite may, in some arrangements, retransmit the information to a remote ground station along the route. In other arrangements, the receiving satellite may be retransmit the information directly to another satellite along the route, which, in turn may itself retransmit to another satellite, or to a remote ground station. The transmission path, or data link, directly between a pair of satellites is sometimes referred to as an inter-satellite cross link in the routing process. While transmission of data between the ground station and satellite is typically by radio frequency (RF) energy, the use of laser energy, at least for communication between satellites (i.e., for the inter satellite cross links) offers distinct advantages over radio frequency (RF) systems, particularly for satellite cross links. These advantages include the potential for a great reduction in weight, power for a given data rate, lack of optical spectral congestion and frequency allocation requirements, immunity to electromagnetic interference, co-located transmitters and RF jammers.

SUMMARY OF THE INVENTION

In accordance with the present invention, a laser communication system adapted for use in a satellite communication system is provided. The satellite carries a laser communication system. The laser communication system includes a plurality of active and passive optical elements packaged in a monolithic, or single block, structure for interfacing between a focusing telescope of the satellite and laser transmitters/receivers of the laser communication system. Laser energy is directed between the telescope and the transmitters/receivers by the active and optical elements, such laser energy passing through the monolithic structure solely as collimated light. In this way, relay elements, such as diffractive optics and focusing lenses, and their concomitant alignment requirements, are eliminated from the monolithic structure.

In accordance with another feature of the invention, the monolithic structure is configured to provide all optic axes between the telescope and a laser transmitter/receivers in substantially a common plane. More particularly, the laser communication system includes an acquisition laser transmitter and an acquisition receiver used to enable the satellite to link up with another satellite, or ground station, during an acquisition mode, and a communication laser transmitter and an communication receiver used to enable the satellite to exchange data with the linked up satellite, or ground station. The monolithic structure is configured to dispose the optic axes between the telescope and laser acquisition and communication lasers and the optic axes between the telescope and the acquisition and communication receivers in substantially a common plane. With such an arrangement, the structural rigidity and hence optical integrity of the monolithic structure is improved.

In accordance with an additional feature of the invention, a single detector is provided for both the acquisition mode and a subsequent tracking mode. More particularly, the laser communication system includes a tracking laser transmitter and a tracking receiver used to enable the satellites to track each other during the tracking mode and thereby maintain the link up with the other satellite, or ground station, after the above described acquisition mode. The satellites communicate with one another during the tracking mode. In a preferred embodiment of the invention, a single charge coupled device (CCD) is used for both acquisition and tracking.

In accordance with still another feature of the invention, a collimating/beam shaping module is provided having affixed thereto a pair of submodular units. More particularly, as noted above, the laser's light passes through the monolithic structure solely as collimated light. In passing between a laser in the system and the monolithic structure, the laser's light beam must shaped and collimated. The first submodular unit includes the laser and a properly aligned beam shaping lens. The second submodular unit includes a mounted collimating lens. The first and second submodular units are aligned with each other and then affixed to each other to provide the collimating/beam shaping module. Next, the collimating/beam shaping module is affixed to the monolithic structure. With such arrangement and method proper accurate alignment of the mounted laser, beam shaping lenses and collimating lens is facilitated.

In accordance with still another feature of the invention, a filter is provided on a surface of the second submodular unit. The filter protrudes beyond the second submodular unit and is provided with a surface adapted to interface, and be affixed to, a surface portion of the monolithic structure.

BRIEF DESCRIPTION OF THE DRAWINGS

For a more complete understanding of the concepts of the invention, as well as the invention itself, reference is now made to the following drawings, in which.

DESCRIPTION OF THE PREFERRED EMBODIMENTS

Figure 1:
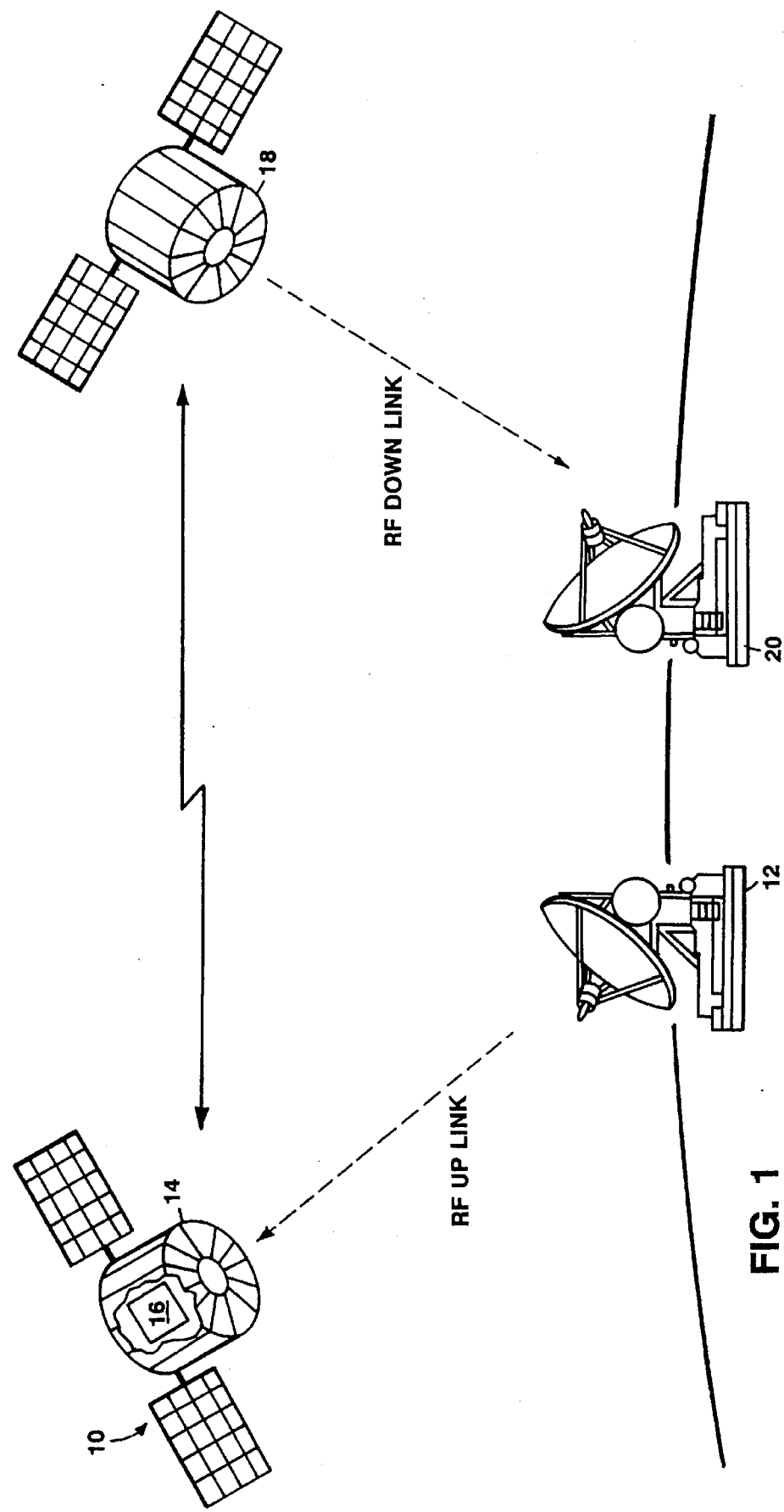
FIG. 1 is a sketch of a satellite communication system wherein a pair of satellites communicate with each other using an inter-satellite cross link routing process, each one of such satellite carrying a laser communication system according to the invention.

Referring now to FIG. 1, a laser satellite communication system 10 is shown. Here, a ground station 12 transmits information to an orbiting satellite 14, the satellite 14 receives the information and relays it, via a laser communication system 16, to be described in detail hereinafter, on board the satellite 14, to a second orbiting satellite 18 in an inter-satellite cross link in the routing process. The second orbiting satellite 18, also carries a laser communication system, not shown, such as the system 16 carried by satellite 14, and then transmits the information to a second ground station 20, as shown. Here the information is transmitted between the satellites 14, 18 and the ground stations 12, 20 using radio frequency signals. It should be understood however that laser (i.e., light) energy signals may also be used. Further, while only two satellites 14, 18 have been shown, many more satellites may be cross linked; either in a low earth orbit constellation (LEO) or in a geosynchronous orbit (GEO) constellation.

Figure 2:
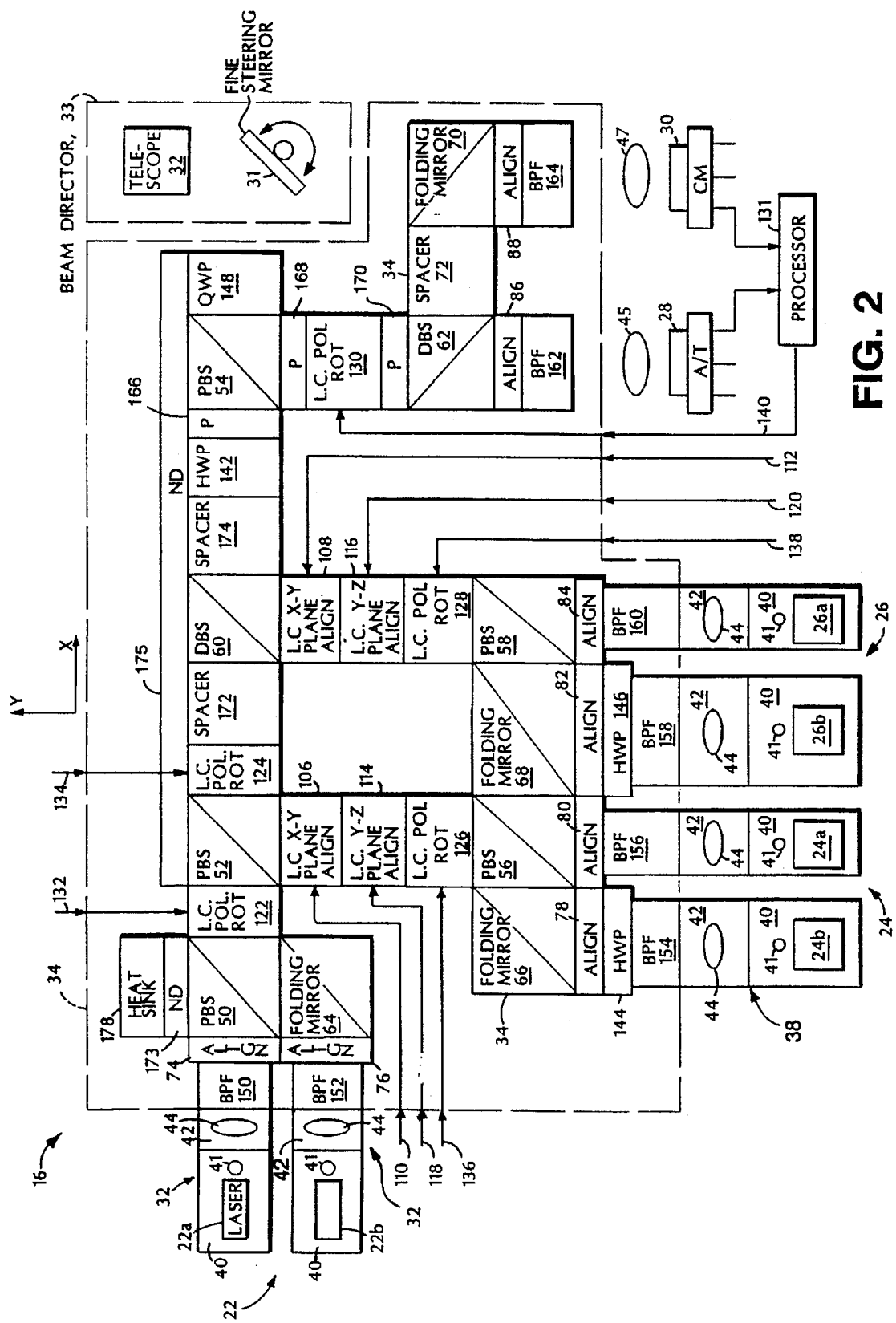
FIG. 2 is a plan view of the laser communication system used in the satellite communication system of FIG. 1.

Referring now to FIG. 2, the laser communication system 16 disposed in each one of the satellites 14, 18 includes: a pair 22 of acquisition laser transmitters 22a, 22b; a pair 24 of tracking laser transmitters 24a, 24b; a pair 26 of communication laser transmitters 26a, 26b; an acquisition/tracking detector/receiver 28; a communication detector/receiver 30; and a beam director 33, here made up of a fine steering mirror 31 and a telescope 32, all optically coupled together in a manner to be described in detail hereinafter by a monolithic optical structure 34. Suffice it to say here, however, that the monolithic optical structure 34 includes a plurality of active and passive optical elements for interfacing between the beam director 33 and the laser transmitters 22a, 22b, 24a, 24b, 26a, 26b and the detector/receivers 28, 30. Laser energy is directed between the laser transmitters 22a, 22b, 24a, 24b, 26a, 26b and the beam director 33 and between the beam director 33 and the detector/receivers 28, 30 by the active and passive optical elements. The laser energy passes through the monolithic optical structure 34 solely as collimated light. The monolithic optical structure 34 is configured so that all optic axes between the beam director 33, the laser transmitters 22a, 22b, 24a, 24b, 26a, 26b and the detector/receivers 28, 30 are disposed in substantially a common plane, here the X-Y plane. The acquisition laser transmitters 22a, 22b and an acquisition/tracking detector/receiver 28 are used to enable the satellite to link up with another satellite, or ground station, during an acquisition mode. The tracking laser transmitters 24a, 24b are used to maintain track with the other satellite, or ground station during a subsequent tracking mode. The communication laser transmitters 26a, 26b and communication detector/receiver 30 are adapted to enable the satellite to exchange data with the linked up satellite, or ground station during the tracking mode. As noted above, the monolithic optical structure 34 is configured to dispose the optic axis between the beam director 33 and laser acquisition, tracking and communication laser transmitters 22a, 22b, 24a, 24b, 26a, 26b and the optic axes between the telescope 32 and the acquisition and communication detector/receivers 28, 30 in substantially a common plane, here the X-Y plane.

As noted above, the laser transmitters 22, 24, 26 and detector/receivers 28, 30 include: tracking laser transmitter 24 for enabling the linked up satellite, or ground station to track the satellite during a tracking mode. A single acquisition/track, here (A/T) detector 28, is used by the satellite during both the acquisition mode and the subsequent tracking mode. As will be described in detail hereinafter, the single detector 28 uses a charge coupled device (CCD).

The laser communication system 16 includes for each one of the laser transmitters 22a, 22b, 24a, 24b, 26a, 26b a collimating/beam shaping module 38. Each one of the module 38 will be described in detail hereafter in connection with FIGS. 3, 4 and 5. Suffice it to say here, however, that the module 38 includes a pair of submodular units 40, 42. A first one of the submodular units, here modular unit 40 includes one of the transmitting lasers 22a, 22b, 24a, 24b, 26a, 26b, respectively, as shown, and a beam shaping lens 41, the second one of the submodular units 42 having a collimating lens 44, as shown. The collimating lens 44 is, here, a molded aspheric collimating lens. The first and second submodular units 40, 42 are aligned with, and affixed to, each other to provide the collimating/beam shaping module 38. The collimating/beam shaping module 38 is then affixed to the monolithic optical structure 34. A bandpass filters 150, 152, 154, 156, 158 and 160 are disposed on an surface of the second submodular units 42, as shown. The bandpass filter 150–160 protrudes beyond the second submodular unit 42 and is provided with a surface adapted to interface, and be affixed to, a surface portion of the monolithic optical structure 34.

More particularly, the monolithic optical structure 34 includes a plurality of glass cubes and planar thin films bonded together and disposed to pass such light signals therethrough as only substantially collimated light. The pair of acquisition laser transmitters 22 include a primary acquisition laser transmitter 22b and a redundant acquisition laser transmitter 22a. Here, both such acquisition laser transmitters 22a, 22b transmit light at a predetermined wavelength, here 810 nm, but which can operate from 804 to 816 nm over temperature. The primary acquisition laser transmitter 22b here transmits light with, here, vertical polarization; while the redundant acquisition laser transmitter 22a transmits such light with, here, horizontal polarization. The pair of tracking laser transmitters 24 include a primary tracking laser transmitter 24b and a redundant tracking laser transmitter 24a. Here, both such tracking lasers transmitters 24a, 24b transmit light at a predetermined wavelength, here also 810 nm. It is again noted that because the acquisition and tracking laser transmitters 22, 24 use the same wavelength, the laser transmitters 22, 24 operate sequentially rather than simultaneously. Here both the primary and redundant tracking laser transmitters 24a, 24b transmit light with the same, here horizontal, polarization. The pair of communication laser transmitters 26 include a primary laser transmitter 26b and a redundant communication laser transmitter 26a. Here, both such communication lasers transmitters 26a, 26b transmit light at a predetermined wavelength, here a longer wavelength of 860 nm. Here, both the primary and redundant communication laser transmitters 26a, 26b transmit light with the same, here horizontal polarization. The acquisition/tracking detector/receiver 28 is adapted to operate with laser energy of, here, 780 nm while the communication detector/receiver 30 is here adapted to operate with laser energy of 830 nm. Here, the telescope 32 is a Cassegrainian telescope of any conventional design.

As noted above, the monolithic optical structure 38 includes thin films. One type of thin film used is, here a liquid crystal polarization rotator. As discussed in my paper entitled "Technologies and techniques for lasercom terminal size, weight, and cost reduction" Free-Space Laser Communication Technology II, Proc. SPIE, VOL. 1218, pp. 62–69, 1990, my co-authored paper entitled "Liquid crystals for laser applications" by Chinh Tan and myself, Robert T. Carlson, published January 1991 in Proceedings of the SPIE, #1866 as well as in my co-authored paper entitled "An advanced lasercom terminal for intersatellite crosslinks" by myself, Robert T. Carlson, Voula C. Georgeopolous, and Jerold L. Jaeger, published Mar. 2, 1994 in The Proceedings of the 15th International Communications Satellite Systems Conference, March, 1994, the material in all such papers being incorporated herein by reference, by applying a proper voltage on the liquid crystal film, here nematic liquid crystal, light of different polarizations may be directed differently. Here, for example, thin films of nematic liquid crystal at high voltage provide no phase retardation to the light passing therethrough with the result that the polarization of such light remains unchanged. At minimum voltage, however, the polarization of light entering the nematic liquid crystal is rotated 90 degrees so that vertically polarized light entering the crystal leaves the crystal as horizontally polarized light, on the one hand, and horizontally polarized light entering the crystal leaves the crystal as vertically polarized light, on the other hand. Thus, by placing a polarization beamsplitter in the path of the light leaving the liquid crystal rotator, vertically polarized light is, for example, reflected by the beamsplitter to pass along one direction, horizontally polarized light is transmitted through the beamsplitter to pass along another direction. Thus, light may be directed to pass in one of the two directions, selectively, in accordance with the electrical voltage (i.e., control signals) applied to the liquid crystal rotator. Thus, here, as will be described in detail hereinafter, the thin films are responsive to electrical control signals to direct the light signals from either the first primary laser transmitter 22b, 24b, 26b or the redundant laser transmitter 22a, 24a, 26a through the monolithic optical structure 34 to the beam director 33, selectively, in accordance with the control signals. Such is the case for each of the pair of laser transmitters 22, 24, 26; i.e., the pair of acquisition laser transmitters 22 (i.e., the primary acquisition laser transmitter 22b and the redundant acquisition laser transmitter 22a), the pair of tracking laser transmitters 24 (i.e., the primary tracking laser transmitter 24b and the redundant tracking laser transmitter 24a) and the pair of communication laser transmitters 26 (i.e., the primary laser transmitter 26b and the redundant communication laser transmitter 26a). Additionally, a liquid crystal polarization rotator thin film is responsive to electrical control signals to attenuate light from the sun, or signals from another satellite which may saturate either one of the detector/receivers 28, 30. Here, the control signals are developed from the detector/receivers and provide a feedback signal to the thin film, as will be described hereinafter.

Referring now to the details of the monolithic optical structure 34, it should first be noted that the structure includes a plurality of, here twelve glass cubes, here one-half inch glass cubes, which provide: five polarization beamsplitters (PBS) 50, 52, 54, 56, 58, two dichroic beamsplitters (DBS) 60, 62, four folding mirrors 64, 66, 68, 70, and a spacer 72. Also included are a plurality of, here nine active thin film, nematic liquid crystal (LC) polarization rotators: two X-Y plane alignment liquid crystal polarization rotators (LC X-Y PLANE ALIGN) 106, 108 each responsive to control signals on lines 110, 112, respectively, two Y-Z plane alignment liquid crystal polarization rotators (Y-Z PLANE ALIGN) 114, 116, each responsive to control signals on lines 118, 120 respectively, and five 0/90 degree phase retardation liquid crystal polarization rotators (LC POL ROT) 122, 124, 126, 128 and 130, each responsive to control signals on lines 132, 134, 136, 138, 140. Also included are eight passive optical wedges for course alignment (ALIGN) 74, 76, 78, 80, 82, 84, 86, and 88. The course alignment wedges 74, 76, 78, 80, 82, 84, 86, and 88 are, here, fused silica spacers polished to the required wedge angle to cause course alignment in the X-Y and Y-Z planes. Precision alignment is subsequently accomplished with the liquid crystal X-Y plane and Y-Z plane alignment devices 106, 108, 114, and 116. (It should be noted that the course alignment wedges 74–88 are adapted to deviate the beam, or optic axis, between one and ten milliradians and the X-Y plane and Y-Z plane alignment wedges 106, 108, 114, 106 are adapted to deviate the beam, or optic axis, one milliradian, or less. Therefore, while deviations of up to about ten milliradians are possible, all optic axes between the laser transmitters 24, 26, 28 and the beam director 33 and between the beam director 33 and the detector/receivers 28, 30 are substantially in a common plane. To put it another way, all optical blocks, thin films and other optical elements of the monolithic optical structure 34 are in a common plane, here the X-Y plane.) Also included is a plurality of, here nineteen, passive thin film devices: three half wave plates 142, 144, 146, one-quarter wave plate 148, eight bandpass filters 150, 152, 154, 156, 158, 160, 162, 164, and three polarization filters 166, 168, 170 used to purify the desired linear polarization, two spacers 172, 174, to provide proper alignment of the blocks, and two absorptive neutral filters (ND) 173, 175. A heat sink 178 is mounted, as shown. The elements 50–58, 60–62, 64–70, 72, 74–88, 106–108, 114–116, 122–130, 142–146, 148, 150–164, 166–170, 172–175 are permanently bonded together with any suitable optical cement, to form a monolithic optical structure 32, as shown; all such elements being disposed in a common plane, here the X-Y plane, as shown. Fused silica is used throughout because of its superb radiation resistance and thermal stability. The monolithic optical structure 34 is here, less than 6 cubic inches (six inches along the X axis, 2.5 inches along the Y axis and 0.5 inches along the Z axis) and weighs less than 1 pound. Because optical paths are short, all light passing through the structure 34 is substantially collimated light thereby eliminating relay, or focusing optical assemblies and their concomitant alignment requirements. Further, a pair of lenses, beam shaping lens 41, collimating lens 44 are mounted within a single module 38, along with their associated laser transmitter, in a manner to be described in detail hereinafter in connection with FIGS. 3, 4, and 5. The lenses 41, 44 are used for beam shaping and collimating, respectively, the light transmitted to the monolithic optical structure 34 by the laser transmitters 22, 24, 26. Lenses 45, 47 are used for focusing the collimated light exiting the monolithic optical structure 34 to the detector/receivers 28, 30, respectively, as shown.

As noted above, light transmitted by either one of the communication laser transmitters 26a, 26b (i.e., entering the monolithic optical structure 34) is horizontally polarized. Likewise, light transmitted by either one of the tracking laser transmitters 24a, 24b is horizontally polarized. However, the wavelength of the light transmitted by the communications laser transmitters 26a, 26b and by the tracking laser transmitters 24a, 24b are different. The wavelength of the light transmitted by either one of the tracking laser transmitters 24a, 24b is shorter than the light transmitted by either one of the communication laser transmitters 26a, 26b. Here, the wavelength of each one of the communication laser transmitters 26a, 26b is 860 nm and the wavelength of each one of the tracking laser transmitters 24a, 24b is 810 nm.

The horizontally polarized light from the primary communication laser transmitter 26b passes through the bandpass filter 158 to half wave plate 146 for conversion to vertical polarization. The vertically polarized light passes through the course alignment wedge 82 and is then reflected by the folding mirror 68 to a polarization beamsplitter 58. The polarization beamsplitter 58 reflects the vertically polarized light to the liquid crystal polarization rotator 128. In the high voltage state, the liquid crystal polarization rotator 128 passes the vertically polarized to the Y-axis and X-axis alignment liquid crystal devices 116, 108, to a dichroic beamsplitter 60, here designed for vertically polarized light. Here, the dichroic beamsplitter is designed to reflect light having a wavelength of, here 860 nm and transmit light having a wavelength of, here 810 nm. Thus, the dichroic beamsplitter 60 is designed to reflect the higher, or longest of these two wavelengths and to transmit light having the shortest of these two wavelengths. Therefore, the dichroic beamsplitter 60 reflects the longer wavelength, vertically polarized light from the primary communication laser transmitter 26b through spacer 174 to a half wave plate 142 for conversion from vertical polarization to horizontal polarization. The horizontally polarized light passes through a polarization filter 166 to a polarization beamsplitter 54. The polarization beamsplitter 54 transmits the horizontally polarized light to a quarter wave plate 148 for conversion to right hand circular polarization. The right hand circularly polarized light is directed by the beam director 33 to a receiver external to the satellite.

The horizontally polarized light from the redundant communication laser transmitter 26a passes through the bandpass filter 160 and course alignment wedge 84 to a polarization beamsplitter 58. (Unlike the light from the primary laser transmitter, the light from the redundant communication laser transmitter does not pass through a half wave plate to the polarization beamsplitter; thus, the horizontally polarized light of the redundant communication transmitting laser remains horizontally polarized). The polarization beamsplitter 58 transmits the horizontally polarized light to the liquid crystal polarization rotator 128. In a low voltage state, the liquid crystal polarization rotator 128 rotates the horizontally polarized light 90 degrees and thereby converts the horizontally polarized light to vertical polarization. The vertically polarized light passes through Y-axis and X-axis alignment liquid crystal devices 116, 118 to the dichroic beamsplitter 60, here, as noted above designed for vertically polarized light, to reflect such vertically polarized light if such light has the higher of two wavelengths. Here, as noted above, the wavelength is 860 nm. The reflected, vertically polarized light passes through spacer 174 to a half wave plate 142 for conversion from vertical polarization to horizontal polarization. The horizontally polarized light passes through a polarization filter 166 to a polarization beamsplitter 54. The polarization beamsplitter transmits the horizontally polarized light to a quarter wave plate 148 for conversion to right hand circular polarization. The right hand circularly polarized light is directed by the beam director 33 to a receiver external to the satellite.

The horizontally polarized light from the primary tracking laser transmitter 24b passes through a bandpass filter 154 to a half wave plate 144 for conversion to vertical polarization. The vertically polarized light passes through course alignment wedge 78 and is then reflected by the folding mirror 66 to the polarization beamsplitter 56. The polarization beamsplitter 56 reflects the vertically polarized light to the liquid crystal polarization rotator 126. In the high voltage state, the liquid crystal polarization rotator passes vertically polarized light through the Y-Z plane and X-Y plane alignment liquid crystal devices 114, 106 to another polarization beamsplitter 52. The polarization beamsplitter reflects the vertically polarized light to a liquid crystal polarization rotator 124. The voltage on the liquid crystal polarization rotator is high so that the vertically polarized light remains vertically polarized. The vertically polarized light passes through the spacer 172 to the dichroic beamsplitter 60. The dichroic beamsplitter 60 transmits the 810 nm wavelength, vertically polarized light through spacer 174 to the half wave plate 142. The half wave plate 142 converts the vertically polarized light to horizontally polarized light. The horizontally polarized light passes through the polarization filter 166 to a polarization beamsplitter 54. The polarization beamsplitter 54 transmits the horizontally polarized light to a quarter wave plate 148 for conversion to right hand circular polarization. The right hand circularly polarized light is directed by the beam director 33 to a receiver external to the satellite.

The horizontally polarized light from the redundant tracking laser transmitter 24a passes through a bandpass filter 156 and course alignment wedge 80 to a polarization beamsplitter 56. (Unlike the light from the primary tracking laser transmitter, the light from the redundant tracking laser transmitter does not pass through a half wave plate to the polarization beamsplitter; thus, the horizontally polarized light of the redundant tracking transmitting laser remains horizontally polarized). The polarization beamsplitter 56 transmits the horizontally polarized light to the liquid crystal polarization rotator 126. In a high voltage state, the horizontally polarized light remains horizontally polarized as it passes through the liquid crystal polarization rotator 126. The vertically polarized light passes through the Y-Z plane and X-Y plane alignment liquid crystal devices 114, 106 to a second polarization beamsplitter 52. The polarization beamsplitter 52 reflects the vertically polarized light to a second liquid crystal polarization rotator 124. In a high voltage state, the vertically polarized light remains vertically polarized. The vertically polarized light is passes through spacer 172 to a dichroic beamsplitter 60. Here, the redundant tracking laser transmitter also has the shorter, 810 nm wavelength. The dichroic beamsplitter 60 transmits the vertically polarized light through spacer 174 a half wave plate 142 for conversion from vertical polarization to horizontal polarization. The horizontally polarized light passes through a polarization filter 166 to a polarization beamsplitter 54. The polarization beamsplitter 54 transmits the horizontally polarized light to a quarter wave plate 148 for conversion to right hand circular polarization. The right hand circularly polarized light is directed by the beam director 33 to a receiver external to the satellite.

The primary and secondary acquisition laser transmitters 22b, 22a transmit light at 810 nm; i.e., the shorter wavelength. Further, the primary acquisition laser transmitter 22b transmits light with vertical polarization; while the redundant laser transmitter 22a transmits light with horizontal polarization.

Thus, the vertically polarized light transmitted by the primary acquisition laser transmitter 22b passes through bandpass filter 152 and alignment wedge 76 and is then reflected by folding mirror 64 to polarization beamsplitter 50. The vertically polarized light is reflected by the polarization beamsplitter 50 to a liquid crystal polarization rotator 122. In a low voltage state, the liquid crystal polarization rotator 122 converts the vertically polarized light to horizontal polarization. The horizontally polarized light is transmitted by a second polarization beamsplitter 52 to a second liquid crystal polarization rotator 124. In a high voltage state, the horizontally polarized light remains horizontally polarized as it passes through the liquid crystal polarization rotator 124. The shorter wavelength, horizontally polarized light passes through spacer 172 to dichroic beamsplitter 60 and is then transmitted by the dichroic beamsplitter 60, through spacer 174, to a half wave plate 142. The half wave plate 142 converts the horizontally polarized light to vertical polarization. The vertically polarized light is transmitted through polarization filter 166 to polarization beamsplitter 54. The polarization beamsplitter 54 transmits the vertically polarized light, to quarter wave plate 148 for conversion to right hand circular polarization. The right hand circularly polarized light is directed by the beam director 33 to a receiver external to the satellite.

The horizontally polarized light transmitted by the redundant acquisition laser transmitter 22a is transmitted through a bandpass filter 150 and alignment wedge 74 to a polarization beamsplitter 50. The horizontally polarized light is transmitted by the polarization beamsplitter 50 to a liquid crystal polarization rotator 122. In a high voltage state, horizontally polarized light remains horizontally polarized as it passes through the liquid crystal polarization rotator 122. The horizontally polarized light is transmitted by polarization beamsplitter to a second liquid crystal polarization rotator 124. In a high voltage state, the horizontally polarized light remains horizontally polarized as it passes through the liquid crystal polarization rotator 124. The shorter wavelength, horizontally polarized light is transmitted through spacer 172 to a dichroic beamsplitter 60. The light is transmitted through the dichroic beamsplitter 60, through spacer 174, to a half wave plate 142. The half wave plate 142 converts the horizontally polarized light to vertical polarization. The vertically polarized light is transmitted through the polarization filter 166 and polarization beamsplitter 54 to quarter wave plate 148 for conversion to right hand circular polarization. The right hand circularly polarized light is directed by the beam director 33 to a receiver external to the satellite.

Considering now received light, during he acquisition and tracking modes, left hand circularly polarized light received from a source external to the satellite is directed by the beam director 33 to the quarter wave plate 148 for conversion to vertically polarized light. The vertically polarized light is reflected by the polarization beamsplitter 54, through polarization filter 168 (to purify the vertical polarization), to liquid crystal polarization rotator 130. It should be noted that the liquid crystal polarization rotator 130 in the path of the received light is used to attenuate light from the sun, or incoming signals from another satellite. Thus, if either one of the detectors 28 or 30 tend to saturate, a feedback signal is developed by a processor 131 fed by the outputs of the detectors 28, 30 to decrease the voltage on the liquid crystal polarization rotator 130 via line 140. This, tends to rotate the polarization, which causes attenuation by the polarization filter 170. The light then passes to the dichroic beamsplitter 62. During the acquisition and tracking modes, the light used has a wavelength of here, 780 nm. Light used for communications here has a wavelength of 830 nm. Thus, the acquisition and tracking light have the shorter of the two wavelengths and is transmitted by the dichroic beamsplitter 62, through course alignment wedge 86 and bandpass filter 162, to acquisition/tracking detector 28.

Likewise, left hand circular polarized light received by the satellite with communication information is also converted to vertically polarized light by the quarter wave plate 148 and is reflected by the polarization beamsplitter 54, through the polarization filter 168, to the liquid crystal polarization rotator 130. Here again the control signal on line 140 from processor 131 provides a feedback system to attenuate light from the sun, or from another satellite, which tends to saturate either one of the detectors 28, 30 in the manner described above. The light then passes to the dichroic beamsplitter 62. Because the light used for communications here has a wavelength of 830 nm, i.e., the longer wavelength as compared to the wavelength of the light received for acquisition and tracking, the 830 nm wavelength, vertically polarized light is reflected by the dichroic beamsplitter 62, through spacer 72, to folding mirror 70. The light is reflected by the folding mirror, through course alignment wedge 88 and bandpass filter 164, to communication detector 30.

The bandpass filters 150–164 are centered at the wavelength of the laser light to be passed by such filters and are used in both the transmit and receive channels and to provide channel-to-channel and transmit-receive isolation (i.e., reject all other, unwanted, optical wavelengths). As noted from the above description, the polarization beamsplitters 50, 56, and 58 are used as primary and redundant channel combiners. Dichroic beamsplitters 60 and 62 are used for wavelength division multiplexing on both the transmit and the receive side of the monolithic optical structure. Electro-optic liquid crystal polarization devices, 122, 124, 126, 128 and 130 or phase retarders, are used as polarization rotators for redundancy implementation, and as a strong signal attenuator in the receive path. Electro-optic liquid crystal wedges 106, 108, 114 and 116 are used as precision X-Y plane, Y-Z plane beam deflectors for alignment. More particularly, with the liquid crystal wedges 106, 108, 114, 116 the nematic liquid crystals are in a wedge shaped structure (sandwitched between a pair of plates having planar outer surfaces) so that when a voltage is applied to the liquid crystal the corresponding change in index of refraction causes a deflection in the beam of light passing through the wedge. The X-Y plane alignment wedges 106, 108 deflects the beam in the X-Y plane, and the Y-Z plane alignment wedges 114, 116 deflects the beam in the Y-Z plane. The degree of deflection is controlled by the level of the voltage fed to the wedges 106, 108, 114, 116 established during an initial alignment process and which are maintained during normal operation.

The polarization beamsplitters 50, 52, 54, 56, 58 include of a pair of right angle fused silica prisms cemented together along the hypotenuse, with an embedded multilayer dielectric thin film beamsplitter coating. The dichroic beamsplitters 60, 62 are made of two cemented right-angle prisms with the hypotenuse of one prism coated. The incident light is perpendicular to one face of the cube and the transmitted light exits through the opposite face. The reflected light makes a 90° angle with the incident light and exits through a side face. The dichroic beamsplitters 60, 62, are designed to be selective for s-polarized light. The dichroic beamsplitters 60, 62 are, as discussed above, used for multiplexing the acquisition/tracking and communication channels on the transmit side and demultiplexing the acquisition/tracking and communication channels on the receive side of the terminal. Therefore, there are two dichroic beamsplitters 60, 62, as discussed. A 810/860 nm dichroic beamsplitter 60 for the laser transmitters 22, 24, 26, and an 780/830 nm dichroic beamsplitter 62 for the detector/receivers 28, 30, as discussed above.

As noted above, liquid crystal polarization rotators 122, 124, 126, 128, 130 are used as voltage-controlled electro-optic polarization rotators. Retarders, also called waveplates, are optical devices that divide a light wave into two orthogonal vector components and produce a phase shift between these two components. The components recombine on leaving the device to give a light wave generally of a different polarization form, as discussed above. The liquid crystal polarization rotators, or retarders, rotate p-polarized light into s-polarized and vice versa, for vernier polarization rotation, redundancy switching, path-switching (as for rotators 124, 126, 128, and as a voltage-controlled receive intensity attenuator (as for rotator 130). The nematic liquid crystal cells used are polarization rotators with an electrically adjustable retardance (phase shift). The retardance can be adjusted by applying a 2 kHz square wave ac voltage to the liquid crystal. The retardance decreases as the amplitude of the applied voltage increases. An amplitude of only a couple volts is required.

Figure 3:
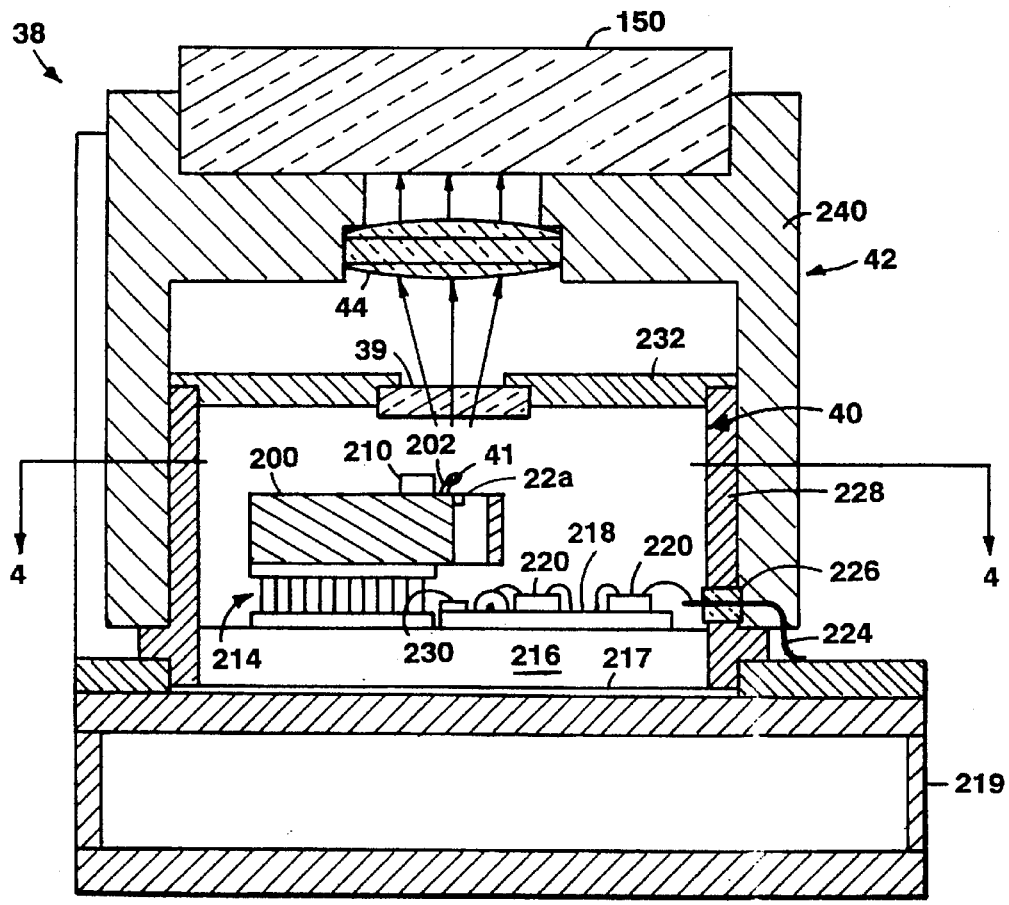
FIG. 3 is a cross section, elevation view of a laser transmitter module used in the laser communication system of FIG. 2.
Figure 4:
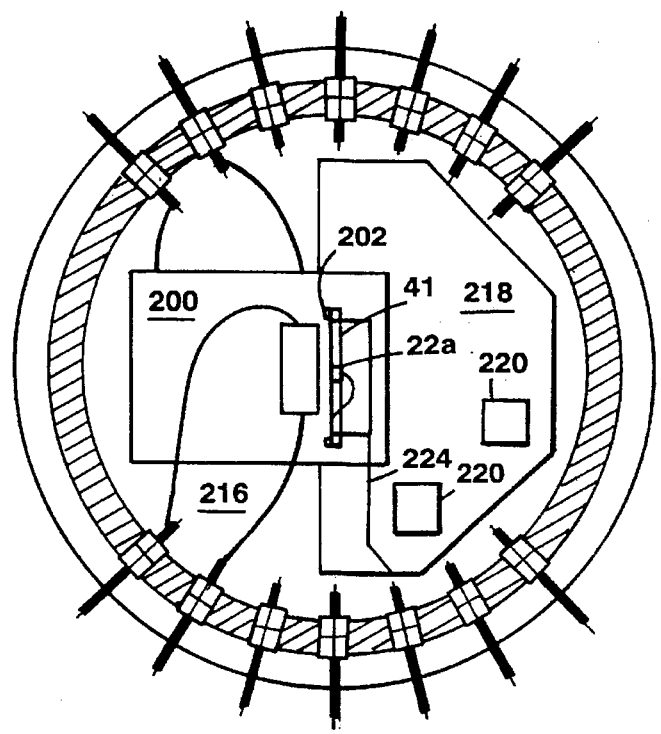
FIG. 4 is a cross section view of the laser transmitter module of FIG. 3, such cross section being taken along line 4—4 in FIG. 3.

Referring now to FIG. 3, an exemplary one of the laser transmitter module 38 is shown. As noted above, the module 38 includes a pair of submodular units 40, 42. Submodular unit 40 being shown in FIGS. 4, 5, and 5A. Each one of the submodular units 40 includes a corresponding one of the laser transmitters 22a, 22b, 24a, 24b, 26a, 26b, here laser transmitter 22a being shown in FIGS. 3, 4 and 5A, a beam shaping lens 41 and an optical window 39, as shown. Submodular unit 42 has the collimating lens 44, as shown. The first and second submodular units 40, 42 are aligned with, and affixed to, each other to provide the collimating/beam shaping module 38. The collimating/beam shaping module 38 is then affixed, here bonded with optical cement, to the monolithic optical structure 34. A corresponding one of the bandpass filters 150–160, here bandpass filter 150 is disposed on a surface of the second submodular unit 42. The filter 150 protrudes beyond the second submodular unit 42 and is provided with a surface adapted to interface, and be affixed to, a surface portion of the monolithic optical structure 34, here to course alignment wedge 74.

Figure 5:
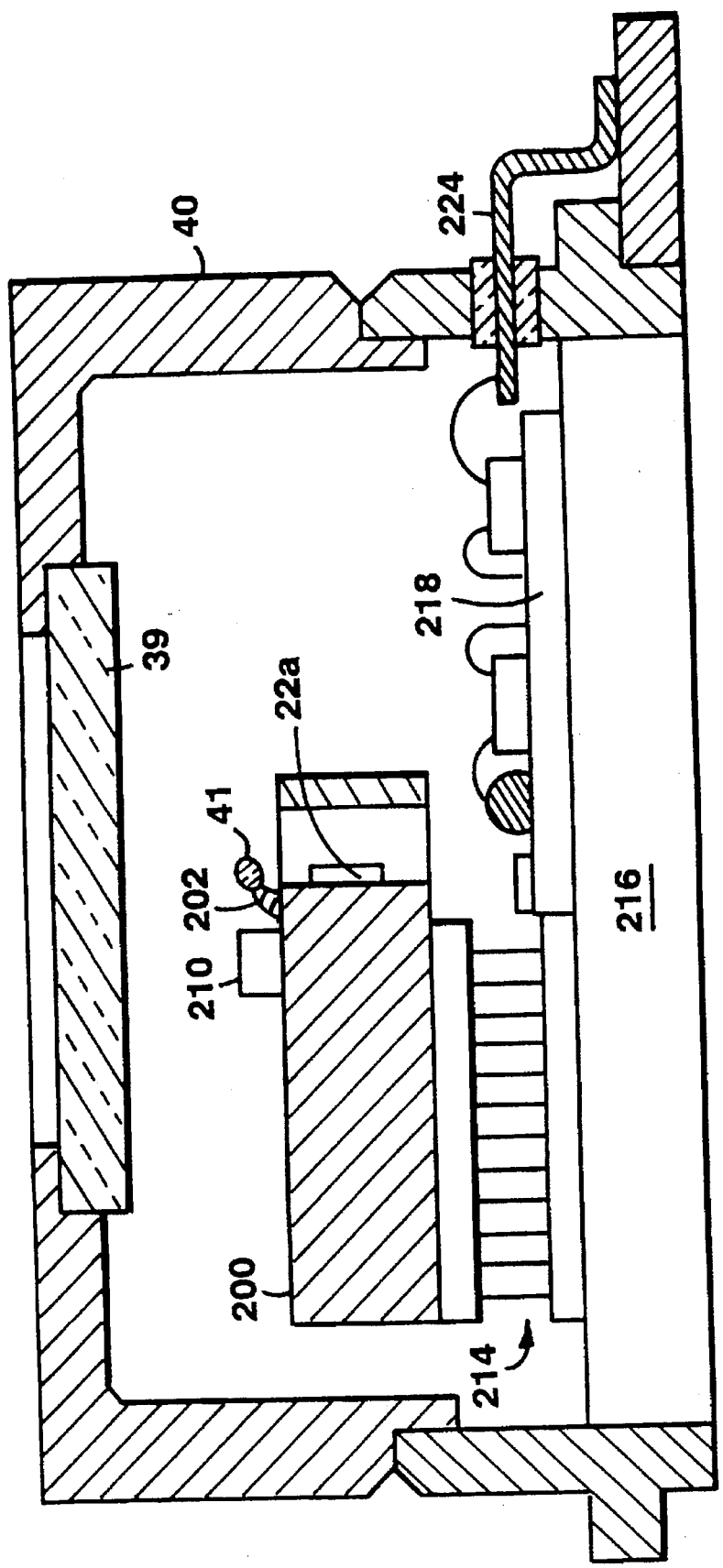
FIG. 5 is a cross sectional elevation view of a submodular units of the module of FIG. 3, such cross section being taken along line 5—5 in FIG. 4.

The laser transmitter module 38 is adapted to provide a beam of collimated light to the diffraction limit. Here, the module 38 is about one cubic inch in volume. The submodular unit 40, includes a laser submount 200 for securing the laser transmitter 22a, here a semiconductor laser chip. (The laser transmitters are diode lasers here with 3–5 watts for acquisition and 150 milli-Watts for communications and tracking). The multi-Watt acquisition laser transmitters 22a, 22b are broad area devices that are not diffraction limited, but capable of flooding a 1–2 milliradian acquisition field of view. A microlens 41 is bonded very close to the laser emitting facet, here 1 to 4 mils, by an epoxy 202, as shown in FIG. 5. The microlens 41 is aligned with the laser 22a using multi-axis micro-positioning translation stages. The microlens 41 is a aspheric rod microlens for anamorphic correction of the laser beam. A thermistor 210 is bonded to the upper surface of the laser submount 200, as shown. The laser submount 200 is mounted on a thermoelectric cooler 214, as shown. The bottom surface of the cooler 214 is disposed on a heat transfer device 216, here a molybdenum heat transfer slug, as shown. An alumina substrate 218, here 25 mils thick, is provided to support hybrid electronic driver circuitry 220 for the laser transmitter 22a. More particularly, in the case of the communication laser transmitter, information signals received by the satellite from the ground station, or the other satellite in the cross link are fed to the module via an input line 224. (In the case of the acquisition and tracking laser transmitters 22, 24 the signals time multiplex the operation of these laser transmitters 22, 24 to enable successive, non-concurrent operation. Such signals are provided by a conventional control circuit, here included in the hybrid driver circuitry 220 to modulate the laser in accordance with signals from the ground station 12 or satellite 18, FIG. 1. More particular, the information line 224 passes through a feedthrough 226 provided in the lower section 228 of a two piece hermetically sealed package 230, here made of Kovar material (Ni-Co-Fe), as shown. The alumina substrate 218 also has disposed on the upper surface thereof a laser energy detector 230, as shown. The detector 230 is disposed under laser submount 200 to receive a small fraction of the laser energy from the rear facet of the laser transmitter; the dominant portion of the laser produced energy passing upwardly, in FIG. 3, through the beam forming microlens 41, through a sapphire window 39 mounted to submodular units 40. The two sections 228, 232 of the Kovar package, or submodular units 40 are bonded together to form the submodular units 40, here by solder. The bottom surface of the alumina substrate 218 is also disposed on the heat transfer device 216, as shown. One method for installing the sapphire window 39 is with a borosilicate glass preform (annulus), not shown, having a moderate melting temperature that permits installation of the sapphire window 41 without degrading its optical quality. The fusible material, not shown, should melt at a temperature far below the softening temperature of the window and should match the thermal expansion coefficient of both the sapphire window 39 and the submodular units 40 package material. This method permits sealing of the sapphire window 39 into the package 40 without introducing mounting wavefront distortion into the window 39.

Preferably, the laser beam produced by the laser transmitter 22a should exit the laser transmitter 22a through the beam shaping microlens 41 with less than 1 milliradian deviation from the perpendicularity with respect to the mechanical axis of the module 38.

The laser transmitter 22a is be cooled by the cooler 214 to pull its nominal as-procured wavelength down to its required wavelength. This, in turn, requires a hermetically sealed package 40 filled with an inert gas in order to prevent condensation on the laser facet. The thermistor 210 measures the temperature of the laser transmitter 22a an provides a feedback control signal to the cooler 214, to provide proper temperature control for the laser transmitter 2a. The Kovar material preferably used for the package 40 has a thermal expansion coefficient ($5.3 \times 10^{-6}$/degree C.) to match the thermal expansion coefficient of the borosilicate glass and also to match the thermal expansion coefficient of the alumina substrate 218 ($6.7 \times 10^{-6}$/degree C.). It also matches the thermal coefficient of expansion of the sapphire window 39. Here, the Kovar package 40 has a molybdenum heat sink slug, as noted above, to provide a low thermal resistance to heat sink 219. Molybdenum is preferred because it has the same thermal expansion coefficient as the Kovar package 40, but significantly better thermal conductivity (140 versus 17 W/m-degrees C.) to efficiently couple the heat out of the thermal cooler 204 and into the heat sink 219 via the heat transfer device 216. An alternative to the use of the molybdenum thermal slug is a metal matrix packaging material, such as SILVAR material developed by Texas Instruments, machined or stamped, and attached with epoxy, solder or braze, may be used. Such material permits the use of fused glass seals, such material also has a high thermal conductivity comparable to molybdenum (157 versus 140 W/m-degrees C.), thereby eliminating the need for a separate thermal slug for the package base 216. As noted above, the thermistor 210 and thermoelectric cooler 214 are provided for laser transmitter 22a operating wavelength and output power stabilization by temperature control. Also provided is a hybrid laser driver circuit 220, here adapted to provide 200–300 milliamps at modulation rates of up to 155 Mbps. The base 216 of the submodular units 40 conducts heat from the lower, warm side of the thermoelectric cooler 214 and the hybrid driver circuitry 220 to heat sink 219 via the base, or heat transfer device 216. A flexible thermal interface 217 having a high thermal conductivity is provided between the heat transfer device 216 and the heat sink 219, as shown, to accommodate differences in thermal expansion between the heat transfer device 216 and the heat sink 219). The flexible interface 217 preferable is a thermal tape with a binder, a silicone-based thermal grease, or a conductive adhesive with the appropriate thermal properties.

The laser transmitter metal package, or submodular units 40, is bonded to submodular units 42. More particularly, the submodular units 40 is bonded onto one end of a collimating lens sleeve 240. The lens sleeve 240 provides a holder for the collimating lens 44 and as a mechanical interface for submodular unit 40. The use of two submodular units 40, 42 for the laser transmitter module 38 splits the laser collimating lens 44 optics and the laser transmitter with its microlens beam shaping lens 41 on its facet optics and thereby provides for two separately aligned units (i.e, submodular unit 40 and submodular unit 42). The use of two separate aligned units, or submodular units 40, 42 relaxes the collimating lens 44 alignment tolerances, as compared to the use of a single module having both the collimating lens 44 and the laser transmitter with its microlens 39 on its facet, because the f/number of the beam into the collimating lens 44 is, typically on the order of f/2.5 rather than the f/1.0 beam that exits the laser transmitter facet.

Preferably, the lens sleeve 240 is an opaque ceramic, a composite material or a metal matrix with low thermal coefficient of expansion so that thermal excursions will not induce a radial tensile strain into the collimating lens 44 or the bandpass filter 150 (FIG. 2) bonded to the ceramic sleeve 240. Material for the sleeve 240 preferably are an Invar material or graphite composite (less than or equal to $0.2 \times 10^{-6}$/degrees C.) or carbide-machinable ceramic ($9.4 \times 10^{-6}$/degrees C.), such as Macor material from Corning, depending on the desired expected thermal variation.

Figure 6:
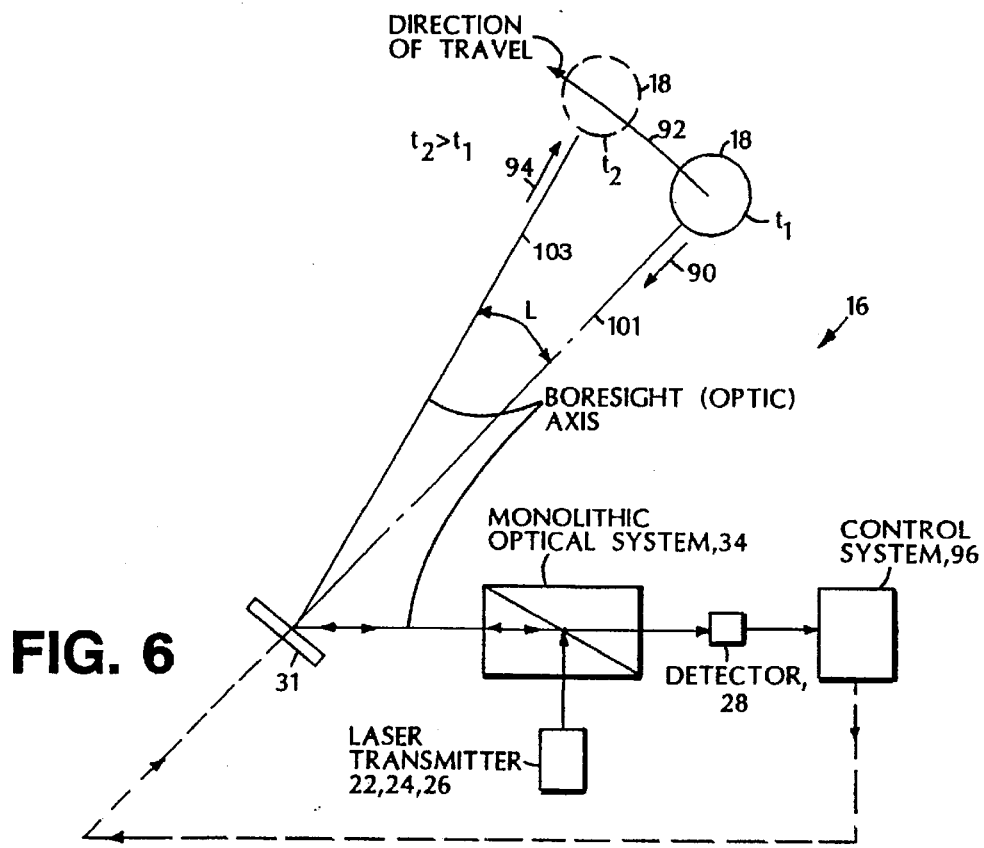
FIG. 6 is a diagram useful in understanding a tracking system used in the laser communication system of FIG. 1.
Figure 7:
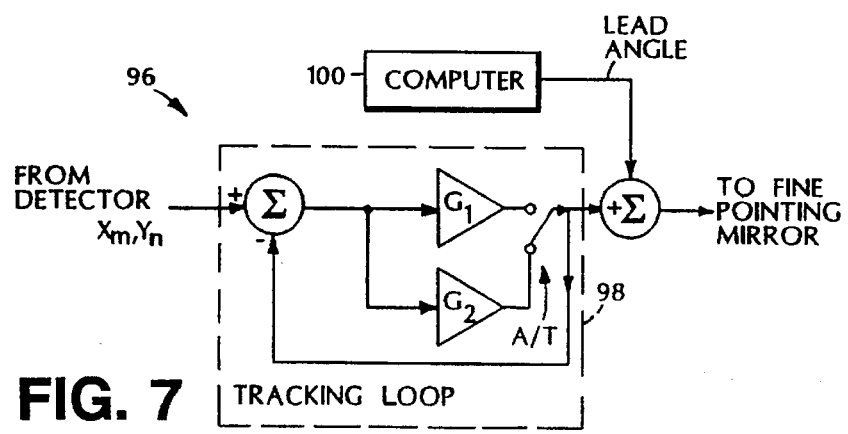
FIG. 7 is a block diagram of a control system used in the tracking system of FIG. 6.
Figure 8:
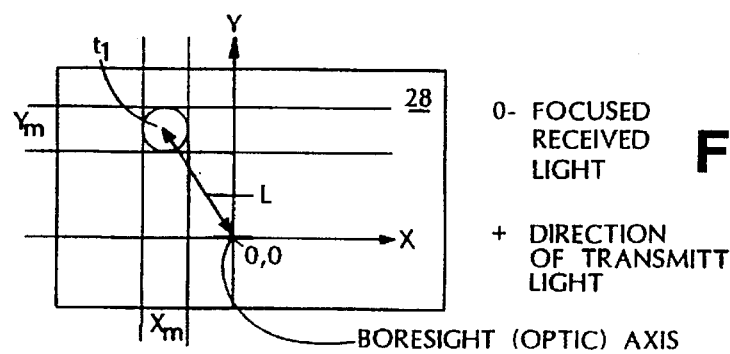
FIG. 8 is a diagram useful in understanding the tracking system of FIG. 6.

Referring now to FIG. 6, the other satellite 18 (FIG. 1) linked with the satellite 16, is shown at a first instant in time t1 and at a somewhat later instant in time t2. The laser energy transmitted by the acquisition/tracking lasers, not shown, in satellite 18, indicated by arrow 90, is directed by the fine steering mirror 31 to the acquisition/tracking detector 28 of satellite 16, through the monolithic optical structure 34. (It is noted that the monolithic optical structure 34 is only diagrammatically represented in FIG. 6). The light received by satellite 16 from satellite 18 at time t1 is directed to the detector 28. Here, detector 28 uses a charge coupled device having an array of rows and columns of detector pixels, as shown, in FIG. 8. As shown by the "o" in FIG. 8, the received light is here shown focused to a pixel having an X, Y coordinate of Xn, Ym. The center, or boresight, or optic axis is indicated by the "x" in FIG. 8. Because of the relative motion between satellite 16 and satellite 18, here indicated by arrow 92 in FIG. 6, it is necessary that the beam of laser energy transmitted by satellite 16, indicated by arrow 94, "lead", or point ahead of, the light (arrow 90) transmitted by the satellite 18 by a lead angle, L. A control system 96 (FIG. 6) responds to the pixel in detector 28 (FIG. 8), here pixel Xn, Ym receiving the focus light from satellite 18 and producing a boresight tracking error, in a conventional feedback control system tracking loop 98, as shown in FIG. 7. Here, however, instead of having the tracking loop 98 drive the fine steering mirror 31 to null the boresight error signal and thereby drive the boresight, or optic axis of the optical system to point at the satellite 18, i.e., point in the direction of the light 90 transmitted by satellite 18, the required lead angle, (as computed by computer 100, in a conventional manner using conventional geometric equations) is added to the tracking signal produced by the tracking loop 98 with the result that the optical axis of the optical system is directed to the expected position of satellite 18 at the subsequent time t2, as shown in FIG. 6. Because the acquisition, tracking and communication lasers are all aligned with the optic axis, the laser beams produced by such laser will be directed to the satellite 18 at its expected position at time t2. Thus, the tracking loop 98 tracks with a finite boresight error signal, i.e., the lead angle, L. With this arrangement, a single mirror, here fine steering mirror 31, is used during all phases (i.e., the acquisition, tracking and communication phases). That is, by using a spatially resolved detector (i.e., here a CCD device, which provides a signal representative of the actual position of the received light energy relative to the boresight, or optic axis) the tracking loop 98 is able to maintain the focused energy at a fixed lead angle, L, off of the boresight, or optic axis, as shown in FIG. 8, thereby eliminating the need for a separate "point ahead" mechanism for the laser transmitters.

To put it another way, the monolithic optical structure 34 (FIG. 6) provides an interface between the beam director, here fine beam steering mirror 31 thereof and the laser transmitter 22, 24, 26 and laser energy detector 28. The monolithic optical structure has an optic axis, or boresight axis, passing between the beam director, here mirror 34 thereof, and the laser transmitter 22, 24, 26 and passing between the beam director/mirror 34 and the laser energy detector 28. Incoming energy from a source of laser energy, satellite 18, moving relative to the tracking, or control system 96 is directed by beam director/mirror 31 and the optical system 34 to the laser energy detector 28 along the optic axis and the laser energy being produced by the laser transmitter 22, 24, 26 is directed through the optical structure 34 and the beam director/mirror 31 along the optic axis to the source 18. The monolithic optical structure 34 directs the incoming laser energy to a position on the laser energy detector 28 (i.e., the focal plane of the CCD array of pixel, FIG. 8) related to the angular deviation between the direction of the optic axis and the direction of the incoming laser energy. Computer 100 (FIG. 7) computes the lead angle, L, between the present direction to the source 18 (i.e., the direction 101 (FIG. 6) between satellite 16 and satellite 18 at time t1) and an expected direction to the source 18 (i.e., the direction 103 between satellite 16 and satellite 18 at time t2. The control system 96 (FIG. 7) is responsive to a signal produced the laser energy detector 28 related to the position of the incoming laser energy on such detector relative to theoptic axis (FIG. 8) and the computed lead angle, L, for tracking the source of incoming laser energy with a tracking error related to the computed lead angle and directing the optic axis along the expected direction 103 (FIG. 6) to the source 18.

Here, the acquisition field of view is 1 milliradian. Here a 256×256 pixel CCD detector permits tracking accuracy on the order of 1 micro radian. If the ratio of acquisition field of view to tracking accuracy is on the order of 1000 to 1, then the same detector may be usable for both the acquisition and tracking modes. In such case, the tracking loop 98 is adapted to have a selected one of two bandwidths; a slower responding (I.e., smaller) bandwidth during the acquisition mode and a larger bandwidth during the tracking mode. Such dual mode operation is represented diagrammatically in the tracking loop by a pair of amplifier-shaping networks G1, G2, respectively; amplifier-shaping network G1 being switched onto the loop 98 during the acquisition mode and amplifier-network G2 being switched into the loop 98 during the tracking mode.

Other embodiments are within the spirit and scope of the appended claim. For example, while the system has been shown for use with satellite-satellite cross links and ground station up-links, the laser communication system could be used in satellites which provide ground surveillance information developed by instrumentation carried on-board the satellite.

What is claimed is:

1. A laser communication system adapted for use in a satellite, such laser communication system comprising:
   a beam director;
   laser transmitter/receivers;
   a monolithic structure comprising a plurality of active and passive optical elements for interfacing between the beam director and the laser transmitters/receivers, laser energy being directed between the beam director and the transmitters/receivers by the active and active optical elements, such laser energy passing through the monolithic structure solely as collimated light.

2. A laser communication system adapted for use in a satellite, such laser communication system comprising:
   a beam director;.
   laser transmitter/receivers;
   a monolithic structure comprising a plurality of active and passive optical elements for interfacing between the beam director and the laser transmitters/receivers, laser energy being directed between the beam director and the transmitters/receivers by the active and active optical elements, such laser energy passing through the monolithic structure solely as collimated light wherein the monolithic structure is configured to provide all optic axes between the beam director and laser transmitter/receivers in substantially a common plane.

3. The laser communication system recited in claim 2 wherein the laser transmitter/receivers include an acquisition laser transmitter and an acquisition receiver used to enable the satellite to link up with another satellite, or ground station, during an acquisition mode, and a communication laser transmitter and an communication receiver adapted to enable the satellite to exchange data with the linked up satellite, or ground station during a communication mode.

4. The laser communication system recited in claim 3 wherein the monolithic structure is configured to dispose the optic axis between the beam director and laser acquisition and communication lasers and the optic axes between the beam director and the acquisition and communication receivers in substantially a common plane.

5. The laser communication system recited in claim 4 wherein the laser transmitter/receivers include: a tracking laser transmitter for enabling the linked up satellite, or ground station to track the satellite during a tracking mode; and a single detector use by the satellite during both the acquisition mode and a subsequent tracking mode.

6. The laser communication system recited in claim 5 wherein the single detector includes a charge coupled device.

7. The laser communication system recited in claim 1 including a collimating/beam shaping module, such module comprising a pair of submodular units, a first one of the submodular unit including one of the transmitting lasers and a beam shaping lens, the second one of the submodular units having a collimating lens, the first and second submodular units being aligned with, and affixed to, each other to provide the collimating/beam shaping module, the collimating/beam shaping module being affixed to the monolithic structure.

8. The laser communication system recited in claim 7 including a collimating/beam shaping module filter disposed on an surface of the second submodular unit.

9. The laser communication system recited in claim 8 wherein the filter protrudes beyond the second submodular unit and is provided with a surface adapted to interface, and be affixed to, a surface portion of the monolithic structure.

10. A method of assembling a laser communication system adapted for use in a satellite, such laser communication system comprising: a beam director; laser transmitter/receivers; and a monolithic structure comprising a plurality of active and passive optical elements for interfacing between the beam director and the laser transmitters/receivers, laser energy being directed between the beam director and the transmitters/receivers by the active and active optical elements, the laser energy passing through the monolithic structure solely as collimated light, the method comprising the steps of:
    forming a first submodular unit, such unit comprising one of the lasers and a properly aligned beam shaping lens;
    forming a second submodular unit, such second unit having a mounted collimating lens;
    aligning the first and second submodular units with each other to form a collimating/beam shaping module; and
    affixing the collimating/beam shaping module to a surface of the monolithic structure.

11. The method recited in claim 10 including the step of providing a filter on an surface of the second submodular unit.

12. The method recited in claim 11 wherein the filter protrudes beyond the second submodular unit and is provided with a surface adapted to interface, and be affixed to, the surface of the monolithic structure.

13. A laser communication system adapted for use in a satellite, such laser communication system comprising:
    a transmitting laser, responsive to electrical signals for converting such electrical signals into corresponding light signals;
    a detector adapted to receive light signals transmitted by a laser and convert such light signals into corresponding electrical signals;
    a beam director adapted to direct light signals transmitted by the satellite to a receiver external to the satellite and to direct light signals received by the satellite from a source external to the satellite; and,
    a monolithic optical structure, for passing therethrough the light signals from the transmitting laser to the beam director and for passing therethrough light signals received by the beam director to the detector, such monolithic optical structure comprising a plurality of glass cubes and planar thin film bonded together and disposed to pass such light signals through the monolithic optical structure as only substantially collimated light.

14. The laser communication system recited in claim 13 including, additionally, a redundant laser transmitter and wherein the thin films are responsive to electrical control signals to direct the light signals from either the first mentioned laser transmitter or the redundant laser transmitter through the monolithic optical structure to the beam director selectively in accordance with the control signals.

15. The laser communication system recited in claim 14 including an second pair of laser transmitters, and wherein the thin films are responsive to electrical control signals to direct the light signals from either a first one of the second pair of laser transmitters or a second one of the second pair of laser transmitters thorough the monolithic optical structure to the beam director selectively in accordance with the control signals.

16. The laser communication system recited in claim 15 including a third pair of laser transmitters, and wherein the thin films are responsive to electrical control signals to direct the light signals from either a first one of the third pair of laser transmitters or a second one of the third pair of laser transmitters thorough the monolithic optical structure to the beam director selectively in accordance with the control signals.

17. The laser communication system recited in claim 16 wherein one of the three pairs of laser transmitters is used during an acquisition mode, a second one of the three pairs of laser transmitters is used during a tracking mode, and a third one of the three pairs of laser transmitters is used for communication of data during the tracking mode.

18. The laser communication system recited in claim 17 including an additional detector, and wherein the thin films are responsive to electrical control signals to attenuate light signals from the beam director to either one of the detectors selectively in accordance with the control signals developed by the detectors and coupled to the thin films in a feedback loop.

19. The laser communication system recited in claim 18 wherein optical paths between the three pairs of transmitting lasers and the beam director and between the beam director and the pair of detectors are disposed in substantially a common plane.

20. The laser communication system recited in claim 19 wherein light signals transmitted by the transmitting laser in one of the three pairs thereof and the light signals transmitted by the transmitting laser in a second one of the three pairs are at different wavelengths.

21. The laser communication system recited in claim 20 wherein laser signals passed from the beam director to a first one of the pair of detectors and lasers signals passed from the beam director to a second one of the pair of beam director have different wavelengths.

22. The laser communication system recited in claim 21 wherein the optical paths of two of the three pairs of transmitting lasers pass through a portion of the monolithic structure in the same direction, wherein the optical paths of the third pair of transmitting lasers pass through one portion of the monolithic structure in a direction perpendicular to the aforementioned direction.

23. The laser communication system recited in claim 1 including a beam shaping/collimating laser transmitter module attached to the monolithic optical structure, such laser transmitter module comprising:

a first submodular unit having a laser transmitter of the laser transmitter/receivers and a beam shaping lens affixed to such laser transmitter;

a second submodular unit having affixed thereto a collimating lens for collimating a beam produced by the laser transmitter;

wherein the first and second submodular units are aligned with, and affixed to, each other to provide the collimating/beam shaping module.

24. The system recited in claim 23 including a collimating/beam shaping module filter disposed on an surface of the second submodular unit, such filter being provided with a surface adapted to interface, and be affixed to, a surface portion of the monolithic optical structure.

25. The system recited in claim 24 wherein the laser transmitter module is adapted to provide a beam of collimated light to the diffraction limit.

26. The system recited in claim 24 the first submodular unit includes a submount for the laser transmitter.

27. The system recited in claim 26 wherein a microlens is affixed to the submount.

28. The system recited in claim 27 wherein the beam shaping lens is a microlens bonded in close proximity to a laser emitting facet.

29. The system recited in claim 28 wherein the microlens is a aspheric rod microlens for anamorphic correction of the laser beam.

30. The system recited in claim 29 including a thermistor bonded to the upper surface of the submount.

31. The system recited in claim 30 includes a laser energy detector disposed to receive a small fraction of the laser energy produced by the laser transmitter passing through the opening to such detector.

32. The system recited in claim 31 including a thermoelectric cooler disposed between the laser transmitter and a heat transfer device.

33. The system recited in claim 32 including a substrate and electronic driver circuitry supported on the substrate and electrically coupled to the laser transmitter.

34. The system recited in claim 33 wherein the first modular unit comprises a hermetically sealed package.

35. The system recited in claim 34 wherein the substrate has disposed on an upper surface thereof the laser energy detector.

36. The system recited in claim 35 wherein the first submodular unit includes a sapphire window mounted to the package.

37. The system recited in claim 35 wherein the first modular unit is filled with an inert gas.

38. The system recited in claim 34 wherein the thermistor measures the temperature of the laser transmitter and provides a feedback control signal to the cooler to provide temperature control for the laser transmitter.

39. The system recited in claim 38 wherein material used for the package has a thermal expansion coefficient matched to the thermal expansion coefficient of the substrate.

40. The system recited in claim 39 wherein the material used for the package has a thermal expansion coefficient matched to the thermal expansion coefficient of the sapphire window.

41. A laser transmitter module, comprising:

a first submodular unit having a laser transmitter and a beam shaping lens affixed to such laser transmitter;

a second submodular unit having affixed thereto a collimating lens for collimating a beam produced by the laser transmitter;

wherein the first and second submodular units are aligned with, and affixed to, each other to provide the laser transmitter module.

42. The module recited in claim 41 including a collimating/beam shaping module filter disposed on an surface of the second submodular unit.

43. The module recited in claim 42 wherein the laser transmitter module is adapted to provide a beam of collimated light to the diffraction limit.

44. The module recited in claim 41 wherein the first submodular unit includes a submount for securing the laser transmitter.

45. The module recited in claim 44 wherein one end of the laser transmitter is mounted to the laser submount.

46. The module recited in claim 45 wherein the beam shaping lens is a microlens bonded in close proximity to a laser emitting facet.

47. The module recited in claim 46 wherein the microlens is an aspheric rod microlens for anamorphic correction of the laser beam.

48. The module recited in claim 47 including a thermistor bonded to the upper surface of the laser submount.

49. The module recited in claim 48 wherein the first submodular unit includes a laser energy detector disposed to receive a small fraction of the laser energy produced by the laser transmitter passing through the opining to such detector.

50. The module recited in claim 41 including a thermoelectric cooler disposed between the laser transmitter and a heat transfer device.

51. The module recited in claim 50 including a substrate and electronic driver circuitry supported on the substrate and electrically coupled to the laser transmitter.

52. The module recited in claim 51 wherein the first modular unit comprises a two piece hermetically sealed package.

53. The module recited in claim 52 wherein the substrate has disposed on an upper surface thereof the laser energy detector.

54. The module recited in claim 53 wherein the first submodular unit includes a sapphire window mounted to the package.

55. The module recited in claim 53 wherein the first modular unit is filled with an inert gas.

56. The module recited in claim 53 wherein the thermistor measures the temperature of the laser transmitter and provides a feedback control signal to the cooler to provide temperature control for the laser transmitter.

57. The module recited in claim 56 wherein material used for the package has a thermal expansion coefficient matched to the thermal expansion coefficient of the substrate.

58. The module recited in claim 57 wherein the material used for the package has a thermal expansion coefficient matched to the thermal expansion coefficient of the sapphire window.

59. The system recited in claim 1 wherein the transmitter/detectors include a single detector for an acquisition mode and a tracking mode and wherein the communication system includes a control system, fed by the detector, to produce control signals for positioning the beam director.

60. The system recited in claim 59 wherein the control system includes a tracking loop fed by the single detector and a lead angle computer for driving the optic axis of the monolithic optical structure to a predetermined tracking error, such tracking error being related to a lead angle computed by the lead angle computer.

61. A tracking system for tracking a source of incoming laser energy moving relative to the tracking system and directing a beam of laser energy to such source, such system comprising:

a beam director;

a laser transmitter a laser energy detector;

a optical structure having an optic axis passing between the beam director and the laser transmitter and passing between the beam director and the laser energy detector, the incoming energy being directed by beam director and the optical system to the laser energy detector along the optic axis and the laser energy being produced by the laser transmitter being directed through the optical structure and the beam director along the optic axis to the source, the optical system directing the incoming laser energy to a position on the laser energy detector related to the angular deviation between the direction of the optic axis and the direction of the incoming laser energy;

a computer for computing a lead angle between the present direction to the source and an expected direction to the source; and a control loop, responsive to: a signal produced by the laser energy detector related to the position of the incoming laser energy on such detector relative to the optic axis; and, the computed lead angle, for tracking the source of incoming laser energy with a tracking error related to the computed lead angle and directing the optic axis along the expected direction such source.

62. A laser communication system adapted for use in a satellite, such laser communication system comprising:

a beam director;

laser transmitter a laser energy detector;

a monolithic structure comprising a plurality of active and passive optical elements for interfacing between the beam director and the laser transmitter and laser energy detector, such monolithic optical structure having an optic axis passing between the beam director and the laser transmitter and passing between the beam director and the laser energy detector, incoming energy from a source of laser energy moving relative to the tracking system being directed by beam director and the optical system to the laser energy detector along the optic axis and such laser energy being produced by the laser transmitter being directed through the optical structure and the beam director along the optic axis to the source, the optical system directing the incoming laser energy to a position on the laser energy detector related to the angular deviation between the direction of the optic axis and the direction of the incoming laser energy;

a computer for computing a lead angle between the present direction to the source and an expected direction to the source; and a control loop, responsive to: a signal produced the laser energy detector related to the position of the incoming laser energy on such detector relative to the optic axis; and, the computed lead angle, for tracking the source of incoming laser energy with a tracking error related to the computed lead angle and directing the optic axis along the expected direction such source.

* * * * *